(12) United States Patent
Takahara et al.

(10) Patent No.: US 10,011,671 B2
(45) Date of Patent: Jul. 3, 2018

(54) ADHESIVE

(71) Applicant: JAPAN SCIENCE AND TECHNOLOGY AGENCY, Saitama (JP)

(72) Inventors: Atsushi Takahara, Fukuoka (JP); Jin Nishida, Fukuoka (JP)

(73) Assignee: JAPAN SCIENCE AND TECHNOLOGY AGENCY, Saitama (JP)

(*) Notice: Subject to any disclaimer, the term of this patent is extended or adjusted under 35 U.S.C. 154(b) by 0 days.

(21) Appl. No.: 14/914,289

(22) PCT Filed: Jul. 10, 2014

(86) PCT No.: PCT/JP2014/068499
§ 371 (c)(1),
(2) Date: Feb. 25, 2016

(87) PCT Pub. No.: WO2015/029615
PCT Pub. Date: Mar. 5, 2015

(65) Prior Publication Data
US 2016/0200952 A1    Jul. 14, 2016

(30) Foreign Application Priority Data

Aug. 26, 2013  (JP) ................ 2013-175029

(51) Int. Cl.
*C09J 139/00* (2006.01)
*C08F 220/58* (2006.01)
*C09J 9/00* (2006.01)
*C09J 201/02* (2006.01)
*C09J 133/24* (2006.01)

(52) U.S. Cl.
CPC ............... *C08F 220/58* (2013.01); *C09J 9/00* (2013.01); *C09J 133/24* (2013.01); *C09J 201/02* (2013.01)

(58) Field of Classification Search
None
See application file for complete search history.

(56) References Cited

U.S. PATENT DOCUMENTS

| | | | |
|---|---|---|---|
| 4,157,418 | A | 6/1979 | Heilmann |
| 4,172,934 | A | 10/1979 | Heilmann |
| 5,744,153 | A | 4/1998 | Yewey et al. |

(Continued)

FOREIGN PATENT DOCUMENTS

| | | |
|---|---|---|
| JP | 54-120643 | 9/1979 |
| JP | 61-245149 | 10/1986 |

(Continued)

OTHER PUBLICATIONS

Chinese Office Action dated Jan. 26, 2017 in corresponding Chinese Patent Application No. 201480047117.3 with English translation.

(Continued)

*Primary Examiner* — Richard A Huhn
(74) *Attorney, Agent, or Firm* — Wenderoth, Lind & Ponack, L.L.P.

(57) ABSTRACT

The object of the present invention is to provide a novel adhesive. The characteristics of the present invention is an adhesive comprising an organic polymer having a main chain formed by a water-soluble polymer unit, and a hydrophilic organic group and a self-assembling group bonded to the water-soluble polymer unit; and a curing agent.

13 Claims, 2 Drawing Sheets

(56) References Cited

U.S. PATENT DOCUMENTS

| | | |
|---|---|---|
| 5,759,563 A | 6/1998 | Yewey et al. |
| 5,773,522 A | 6/1998 | Angelucci et al. |
| 5,780,044 A | 7/1998 | Yewey et al. |
| 2010/0012263 A1 | 1/2010 | Oshima et al. |
| 2014/0073733 A1 | 3/2014 | Yokokura et al. |

FOREIGN PATENT DOCUMENTS

| | | |
|---|---|---|
| JP | 4-221396 | 8/1992 |
| JP | 8-504217 | 5/1996 |
| JP | 9-111180 | 4/1997 |
| JP | 9-286930 | 11/1997 |
| JP | 9-302042 | 11/1997 |
| JP | 9-511741 | 11/1997 |
| JP | 2002-145847 | 5/2002 |
| JP | 2007-56066 | 3/2007 |
| JP | 2012-233059 | 11/2012 |
| WO | 2012/150475 | 11/2012 |
| WO | 2012/157630 | 11/2012 |

OTHER PUBLICATIONS

Extended European Search Report dated Feb. 22, 2017 in corresponding European Patent Application No. 14840918.8.
International Search Report dated Sep. 16, 2014 in International Application No. PCT/JP2014/068499.
Office Action dated Sep. 29, 2017 in Chinese Application No. 201480047117.3, with English Translation.
Office Action dated Feb. 12, 2018 in Taiwanese Application No. 103123748, with English translation.

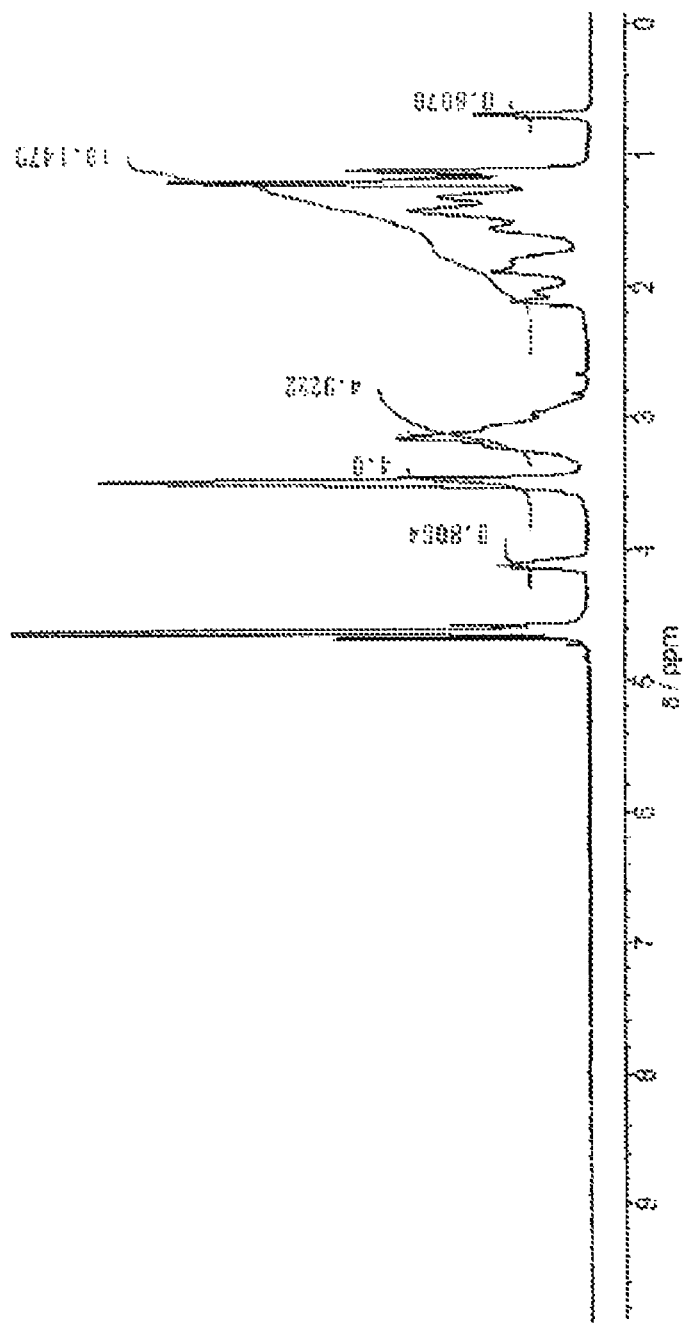

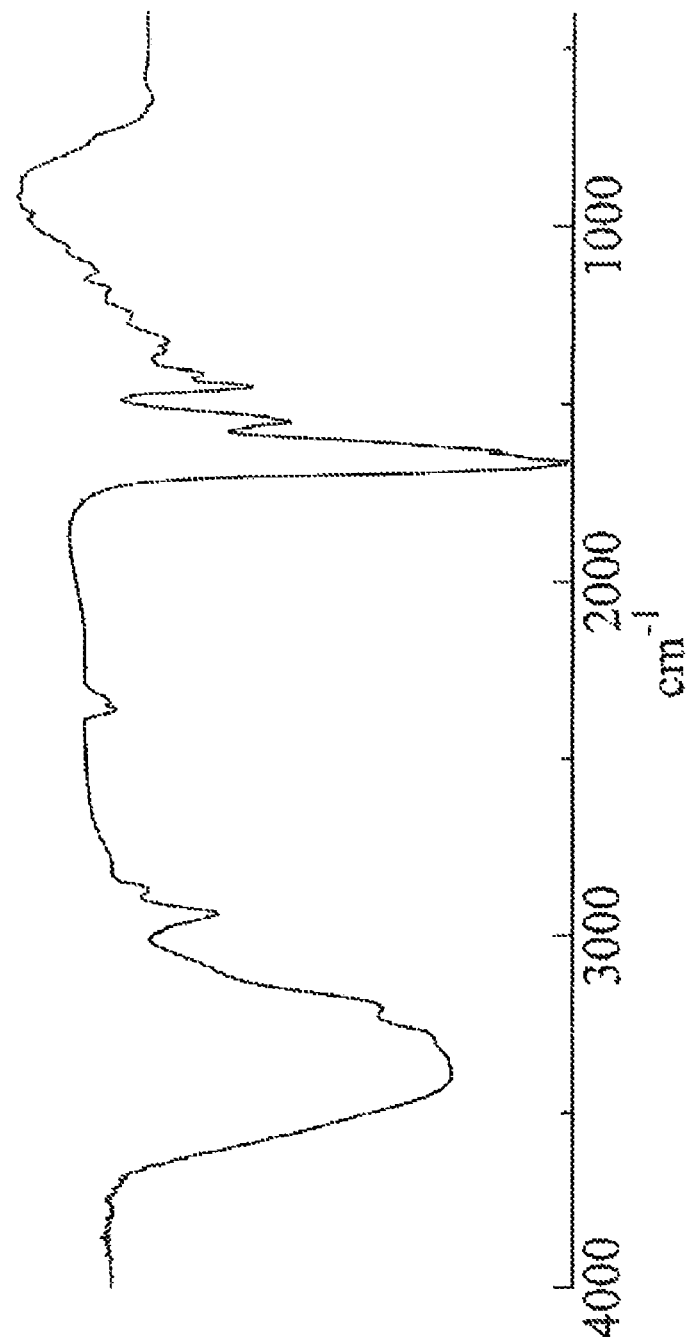
[Fig.2]

ADHESIVE

TECHNICAL FIELD

The present invention relates to an adhesive, preferably an adhesive which cures to exert adhesion properties in water or under wet conditions.

BACKGROUND ART

As an adhesive, in-water adhesives are known which are useful for curing under wet conditions to bond materials to each other. As such an in-water adhesive, a fibrin glue which utilizes scleroprotein produced by reacting thrombin with fibrinogen, cyanoacrylate which cures through the reaction with water to adhere, a gelatin which cures upon the addition of glutaraldehyde, an epoxy resin and others are known, for example. In addition, a polymer having a catechol hydroxy group is also known (Patent Document 1).

Among these in-water adhesives, a fibrin glue, for example, cannot be mass-produced, and it may cause infections since it utilizes biological components. A cyanoacrylate is sometimes harmful to human bodies since a monomer before the curing has toxicity while cured product of cyanoacrylate is sufficiently safe. Glutaraldehyde also has toxicity, which induces curing by its addition to gelatin. An epoxy resin requires long curing time, and also requires heating for complete curing.

In contrast, in-water adhesives have been highly expected in various use applications such as a medical adhesive (an adhesive for implantation use) and surface adhesion of materials (concrete or metal) under wet or in water conditions. Therefore, further development of in-water adhesive is desired.

PRIOR ART DOCUMENT

Patent Document

Patent Document 1: JP-A-2012-233059 (page 1)

SUMMARY OF THE INVENTION

Problems to be Solved by the Invention

The present invention is invented under the above-mentioned situations, and the object of the present invention is to provide a novel adhesive.

Solutions to the Problems

The present inventors made intensive studies to achieve the object, to find that an organic polymer having a main chain formed by a water-soluble polymer unit, and a hydrophilic organic group and a self-assembling group both of which groups are bonded to the water-soluble polymer unit cures with aid of a curing agent to exert adhesion properties and that it can therefore be used as an adhesive, and thus the present invention has been made.

The characteristics of the present invention is an adhesive comprising an organic polymer having a main chain formed by a water-soluble polymer unit, and a hydrophilic organic group and a self-assembling group bonded to the water-soluble polymer unit; and a curing agent. A hydrocarbon group may be bonded to the water soluble polymer unit.

The water-soluble polymer is preferably poly((meth)acrylic acid) or poly((meth)acryl amide), and the hydrophilic organic group, the self-assembling group or the hydrocarbon group is preferably bonded to a side chain of the poly((meth)acrylic acid) or the (meth)acryl amide.

The hydrophilic organic group is preferably a hydrocarbon group substituted by a hydrophilic group, the self-assembling group is preferably an amino acid residue or an oligopeptide, and the hydrophilic group is a hydroxy group or an amino group optionally forming an ammonium salt.

The organic polymer preferably has units represented by general formula (I):

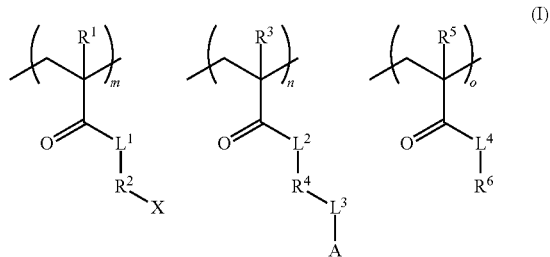

wherein $R^1$ represents a hydrogen atom or a methyl group; $R^2$ represents a hydrocarbon group having 1 to 15 carbon atoms; $L^1$ represents —O— or —NH—; X represents a hydrophilic group; $R^3$ represents a hydrogen atom or a methyl group; $R^4$ represents a hydrocarbon group having 1 to 30 carbon atoms; $L^2$ represents —O— or —NH—; $L^3$ represents a single bond or —CO—; A represents, a sell-assembling group; $R^5$ represents a hydrogen atom or a methyl group; $R^6$ represents a hydrocarbon group having 3 to 30 carbon atoms; $L^4$ represents —O— or —NH—; m, n and o represent the abundance ratios of the units, and each of m and n represents a numerical value more than 0 and o represents a numeral value not less than 0.

Further, the organic polymer is a polymer such that $R^1$ represents a hydrogen atom or a methyl group; $L^1$ represents —O— or —NH—; $R^2$ represents a hydrocarbon group having 1 to 6 carbon atoms; X represents a hydroxy group or an amino group which may form an ammonium salt; $R^3$ represents a hydrogen atom or a methyl group; $R^4$ represents a hydrocarbon group having 3 to 20 carbon atoms; $L^2$ represents —O— or —NH—; $L^3$ represents —CO—; $R^6$ represents a hydrocarbon group having 4 to 10 carbon atoms; A represents an amino acid residue or oligopeptide which contains at least one amino acid selected from alanine, leucine, isoleucine and valine as a constituent amino acid; and m:n:o satisfies (2 to 20):1:(0 to 3) in general formula (I).

The curing agent is preferably an amidating agent for carboxyl terminals of a unit of the oligopeptide.

An organic polymer having a main chain formed by a water-soluble polymer unit, and a hydrophilic organic group and a self-assembling group both bonded to the water-soluble polymer unit is also included in the scope of the present invention. The organic polymer is preferably a polymer having units represented by general formula (I):

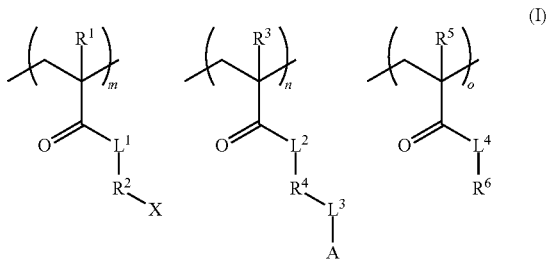

wherein $R^1$ represents a hydrogen atom or a methyl group; $R^2$ represents a hydrocarbon group having 1 to 6 carbon atoms; $L^1$ represents —O— or —NH—; X represents a hydroxy group or an amino group optionally forming an ammonium salt; $R^3$ represents a hydrogen atom or a methyl group; $R^4$ represents a hydrocarbon group having 3 to 20 carbon atoms; $L^2$ represents —O— or —NH—; $L^3$ represents a single bond or —CO—; A represents an amino acid residue or oligopeptide which contains at least one amino acid selected from alanine, leucine, isoleucine and valine as a constituent amino acid; $R^5$ represents a hydrogen atom or a methyl group; $R^6$ represents a hydrocarbon group having 4 to 10 carbon atoms; $L^4$ represents —O— or —NH—; m, n and o represent the abundance ratios of the units, and each of m and n represents a numerical value greater than 0, o represents a numeral value not less than 0, and m:n:o satisfies (2 to 20):1:(0 to 3).

The organic polymer is preferably a polymer such that $R^2$ represents a hydrogen atom or a methyl group; $L^1$ represents —O— or —NH—; $R^2$ represents a linear alkylene group having 1 to 4 carbon atoms; X represents a hydroxy group; $R^3$ represents a hydrogen atom or a methyl group; $R^4$ represents a linear alkylene group having 4 to 8 carbon atoms; $L^2$ represents —O— or —NH—; $L^3$ represents —CO—; A represents an oligopeptide that is an alanine di- to hexa-mer; and m:n:o satisfies (7 to 13):1:(0 to 3) in general formula (I).

The organic polymer of the present invention is produced by a method comprising: copolymerizing a first monomer wherein a hydrophilic organic group is bonded to a monomer of which homopolymer is a water-soluble polymer with a second monomer wherein a self-assembling group is bonded to a monomer of which homopolymer is a water-soluble polymer. The monomer of which homopolymer is a water-soluble polymer is preferably (meth)acrylic acid or (meth)acrylic acid amide.

Effects of the Invention

According to the present invention, the adhesive is excellent in adhesion properties since the adhesive comprises: an organic polymer having a main chain formed by a water-soluble polymer unit, and a hydrophilic organic group and a self-assembling group both bonded to the water-soluble polymer unit; and a curing agent. Therefore, the adhesive has excellent adhesion properties. Particularly, the adhesive cures efficiently even in water and therefore can exert adhesion properties effectively even under wet conditions and for wet surfaces.

BRIEF DESCRIPTION OF THE DRAWINGS

FIG. 1 shows an NMR spectrum of an organic polymer 2 produced in Example 2.

FIG. 2 shows an FT-IR spectrum of the organic polymer 2 produced in Example 2.

MODE FOR CARRYING OUT THE INVENTION

Hereinbelow, each of the components are explained in detail. In the description of the present invention, the term "(meth)acrylic" refers to both of acrylic and methacrylic, and compounds exemplified as the components may be used singly or two or more of them may be used in combination unless otherwise noted.

The adhesive according to the present invention comprises: an organic polymer having a main chain formed by a water-soluble polymer unit and adhesion-controlling functional groups bonded to the water-soluble polymer unit; and a curing agent. The adhesive has such an in-water curable property that the adhesive can cure in water or under wet conditions, and therefore cures efficiently in water or under wet conditions to exert adhesion properties even to wet surfaces.

<<Main Chain formed by a Water-Soluble Polymer Unit>>

The main chain of the organic polymer is formed with a water-soluble polymer unit, so that the compatibility between the polymer and water increases to prevent the aggregation in water and its handling becomes easier even when used in water or under wet conditions. The water-soluble polymer itself is a polymer which can dissolve in water, and the basic properties as an in-water adhesive is controlled by bending adhesion-controlling functional groups such as a hydrophilic organic group and a self-assembling group, where the basic properties as an in-water adhesive includes compatibility, adhesion properties and matrix strength in water or under wet conditions. The adhesion-controlling functional group to be bonded to the water-soluble polymer includes a hydrophilic organic group and a self-assembling group. A hydrocarbon group for hydrophobization, a hydrocarbon group as a linkage group and the like is optionally used as the adhesion-controlling functional group. The adhesion-controlling functional group is preferably bonded to a side chain of the water-soluble polymer. The water-soluble polymer by itself has a solubility its water at 25' C. of, for example, not less than 1 g/L, preferably not less than 10 g/L, more preferably not less than 50 g/L, to which water soluble polymer the adhesion-controlling functional group is not yet bounded.

The water-soluble polymer is preferably a polymer having a bonding site for the adhesion-controlling functional group (such as OH group, COOH group, $NH_2$ group, or $CONH_2$ group). Examples of the water-soluble polymer include polyvinyl alcohol and a water-soluble poly(meth)acrylic polymer such as poly(meth)acrylic acid and poly(meth)acrylamide, and particularly preferred water-soluble polymer is a water-soluble poly(meth)acrylic polymer. The adhesion-controlling functional group can be readily introduced to the water-soluble poly(meth)acrylic polymer.

<<Hydrophilic Organic Group>>

The hydrophilic organic group is useful for improving hydrophilicity of the organic polymer and it becomes possible to increase the adhesion property to an adherend. The hydrophilic organic group preferably comprises an organic group which is capable of bonding to the functional group for bonding in the water-soluble polymer and a hydrophilic group, and is particularly preferably a hydrocarbon group substituted by a hydrophilic group. The term "a hydrophilic group" as used herein refers to a group capable of forming a hydrogen bond.

As the hydrophilic group, a hydroxy group, an amino group optionally forming an ammonium salt (preferably a quaternary ammonium group optionally forming a salt) and the like can be used from the viewpoint of more efficient curing of the adhesive. The quaternary ammonium group preferably forms a salt in conjunction with a halide ion (preferably a chloride ion). From the viewpoint of availability, the hydrophilic group is preferably a hydroxy group.

Examples of the hydrocarbon group to be substituted by the hydrophilic group include known bivalent hydrocarbon group, such as a linear or branched alkylene group, an aliphatic hydrocarbon group, a linear or branched alkenylene group and a linear or branched alkynylene group. From the viewpoint of controlling the curability of the adhesive, a linear or branched alkylene group is preferred, and a linear alkylene group is more preferred. The hydrocarbon group to be substituted by the hydrophilic group generally has 1 to 15 carbon atoms, preferably 1 to 12 carbon atoms, more preferably 1 to 10 carbon atoms.

Specific examples of the hydrocarbon group to be substituted by the hydrophilic group include linear alkylene groups each having 1 to 10 carbon atoms, such as methylene group, ethane-1,2-diyl group, propane-1,3-diyl group, butane-1,4-diyl group, pentane-1,5-diyl group, hexane-1,6-diyl group, heptane-1,7-diyl group, octane-1,8-diyl group, nonane-1,9-diyl group and decane-1,10-diyl group, and linear alkylene groups each having 1 to 8 carbon atoms are more preferred. The hydrocarbon group may be selected as appropriate depending on the types of the hydrophilic group.

In the case where the hydrophilic group is a hydroxy group, a linear alkylene group having 1 to 5 carbon atoms is preferred, and a linear alkylene group having 1 to 3 carbon atoms is more preferred from the viewpoint of controlling adhesion property to an adherend. In the case where the hydrophilic group is an amino group optionally forming an ammonium salt, a linear alkylene group having 1 to 8 carbon atoms is preferred, and a linear alkylene group having 4 to 7 carbon atoms is more preferred, from the viewpoint of controlling adhesion property to an adherend as well as the curability of the adhesive.

As the hydrophilic organic group, a group represented by the following formula can be used specifically. In the formula, * represents a bond to the water-soluble polymer unit.

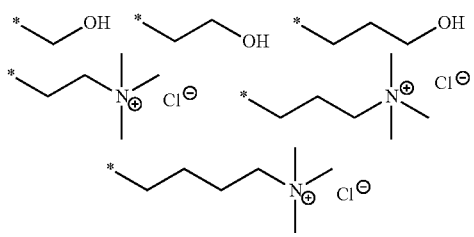

In the organic polymer, the content of the hydrophilic organic group relative to the total content of the adhesion-controlling functional groups including the hydrophilic organic group, the self-assembling group and the hydrocarbon group is, for example, not less than 50% by mass and not more than 65% by mass, and is preferably not less than 55% by mass and not more than 60% by mass from the viewpoint of the improvement in adhesion property to an adherend. The above-mentioned content of the hydrophilic organic group is preferable since the balance between the curability and the adhesion property to an adherend becomes favorable and therefore the adhesion strength of the adhesive can further be improved.

The content ratio of the each adhesion-controlling functional group can be calculated by identifying the state of the bonding by IR spectroscopy and determining the functional group type and its content ratio by NMR spectroscopy. The content ratio of the each functional group can be calculated on the basis of the peak area value ratio of an NMR spectrum, of which peak derives from a terminal of the each functional group.

<<Self-Assembling Group>>

The self-assembling group has a function of forming a crosslinked structure upon the curing of the organic polymer, and is therefore useful for the improvement in the matrix strength as an adhesive.

As the self-assembling group, a peptide-type self-assembling group such as an amino acid residue or an oligopeptide can be used preferably, and an oligopeptide is preferred. As the amino acid that constitutes the peptide, α-amino acid, β-amino acid and the like can be used, and α-amino acid is preferred. The α-amino acid may be a natural amino acid or a non-natural amino acid, and is preferably a natural amino acid from the viewpoint of the reduction in the burden on the environment and living bodies. Examples of the preferred natural amino acid include alanine, leucine, isoleucine and valine. The peptide may comprise a single amino acid or may comprise multiple amino acids. A particularly preferred example of the self-assembling group include a peptide-type self-assembling group comprising a sole kind of amino acid, and a peptide-type self-assembling group in which the single amino acid is alanine, leucine, isoleucine or valine can be represented, for example.

In the case where the self-aggregating group is a peptide-type self-assembling group, the number of the constituent amino acids is generally about 1 to 10, and is preferably 1 to 6, more preferably 1 to 5, from the viewpoint of the adhesive object, the desired degree of curing and the like. The self-assembling property of the peptide-type self-assembling group generally improves with the increase in the number of the constituent amino acids, and it is preferable that the number of the constituent amino acids falls within the above-mentioned range since the self-assembling degree becomes proper, and the resultant adhesive cures efficiently and is dissolved or dispersed in a solvent properly.

The self-assembling degree varies depending on the types of the amino acids, and therefore the number of the constituent amino acids can be adjusted depending on the types of the amino acids. In the case where the amino acid is alanine for example, the peptide-type self-assembling group is preferably di- to hexa-mer, more preferably tri- to penta-mer. In the case where the amino acid is leucine, the peptide-type self-assembling group is preferably mono- to tetra-mer, more preferably mono- to tri-mer. In the case where the amino acid is isoleucine, the peptide-type self-assembling group is preferably mono- to tetra-mer, more preferably mono- to tri-mer. In the case where the amino acid is valine, the peptide-type self-assembling group is preferably mono- to tetra-mer, more preferably mono- to tri-mer.

In the case where the peptide-type self-assembling group is used as the self-assembling group, the self-assembling group may be bonded on the C- or N-terminal side thereof to the water-soluble polymer unit. From the viewpoint of the further effective curability exertion of the present adhesive, it is preferred that the self-assembling group is bonded on the N-terminal side thereof to the water-soluble polymer unit.

As the self-assembling group, a group represented by the following formula can be used specifically.

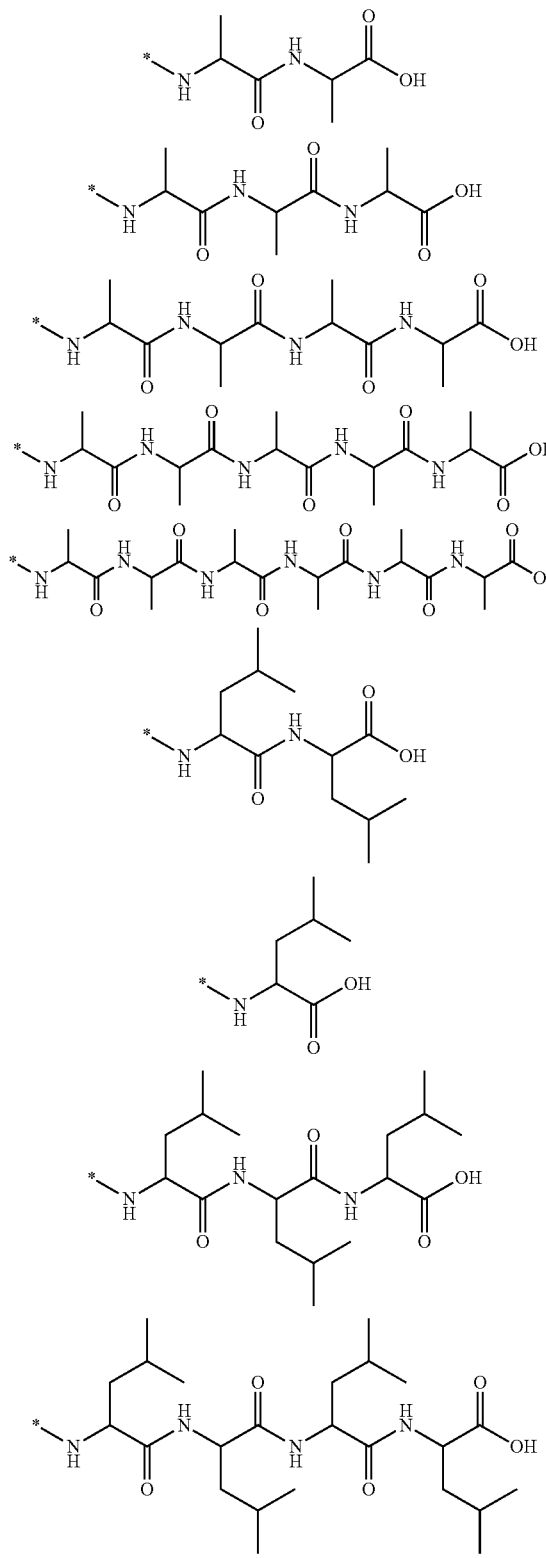

-continued

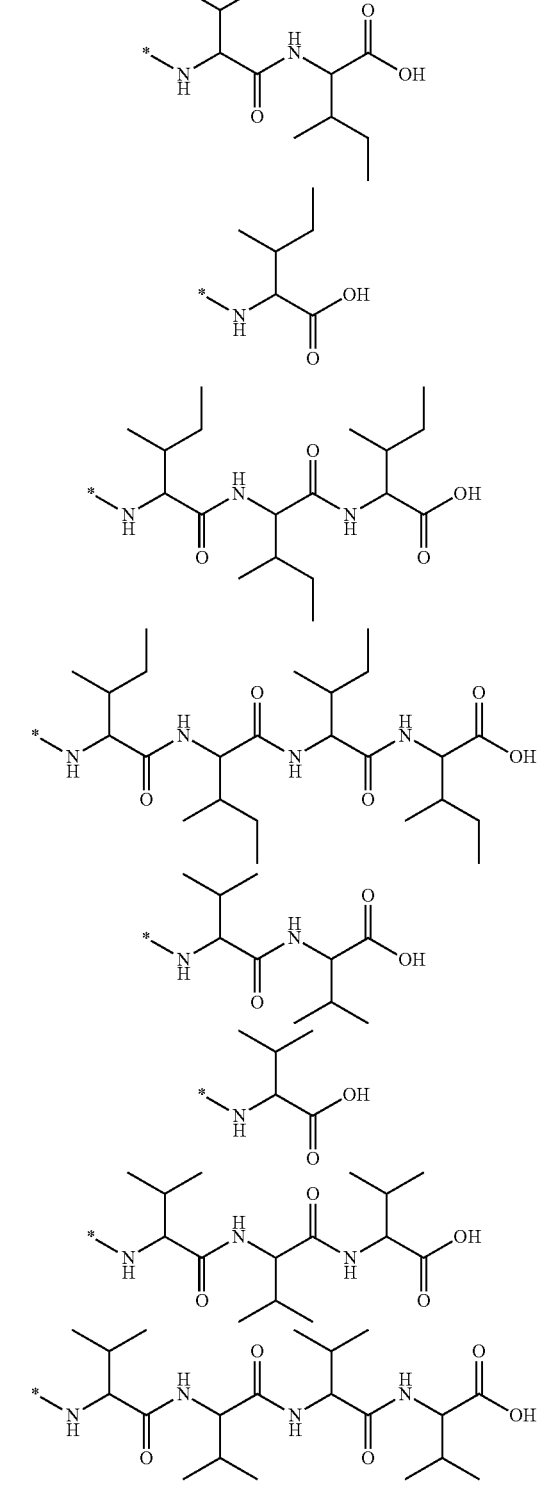

It is preferred that the self-assembling group is bonded to the water-soluble polymer unit through at least a divalent hydrocarbon group as a linkage group. When the self-assembling group is bonded through the hydrocarbon group, a crosslinked structure can be formed easily and therefore the curability becomes able to be controlled. As the hydrocarbon group that serves as a linkage group, a linear or branched alkylene group, an alicyclic hydrocarbon group, a linear or branched alkenylene group and a linear or branched alkynylene group can be used, for example. From the viewpoint of controlling the curability of the adhesive, a linear or branched alkylene group is preferred, and a linear alkylene group is more preferred. The hydrocarbon group as a linkage group for the self-assembling group generally has 1 to 30 carbon atoms, preferably 1 to 25 carbon atoms, more preferably 1 to 20 carbon atoms.

A specific example of the hydrocarbon group as a linkage group is a linear alkylene group having 1 to 20 carbon atoms, such as methylene group, ethane-1,2-diyl group, propane-1,3-diyl group, butane-1,4-diyl group, pentane-1,5-diyl group, hexane-1,6-diyl group, heptane-1,7-diyl group, octane-1,8-diyl group, nonane-1,9-diyl group, decane-1,10-diyl group, undecane-1,11-diyl group, dodecane-1,12-diyl group, tridecane-1,13-diyl group, tetradecane-1,14-diyl group, pentadecane-1,15-diyl group, hexadecane-1,16-diyl group, heptadecane-1,17-diyl group, octadecane-1,18-diyl group, nonadecane-1,19-diyl group and icosane-1,20-diyl group. The hydrocarbon group is more preferably a linear alkylene group having 1 to 19 carbon atoms. The hydrocarbon group can be selected as appropriate depending on the types of the self-assembling group and the number of the amino acid units. For example, in the case where the self-assembling group is oligoalanine, the hydrocarbon group is preferably a linear alkylene group having 2 to 8 carbon atoms, more preferably a linear alkylene group having 3 to 5 carbon atoms. In the case where the self-assembling group is oligoleucine, the hydrocarbon group is preferably a linear alkylene group having 10 to 20 carbon atoms, more preferably a linear alkylene group having 11 to 19 carbon atoms. In the case where the self-assembling group is oligoisoleucine, the hydrocarbon group is preferably a linear alkylene group having 10 to 20 carbon atoms, more preferably a linear alkylene group having 11 to 19 carbon atoms. In the case where the self-assembling group is oligovaline, the hydrocarbon group is preferably a linear alkylene group having 1 to 14 carbon atoms, more preferably a linear alkylene group having 1 to 13 carbon atoms.

In the case where the self-assembling group is bonded to the water-soluble polymer unit through the hydrocarbon group or the like, the hydrocarbon group or the like which is used as a linkage group is categorized as another adhesion-controlling functional group which different from the self-assembling group.

The content of the self-assembling group is, for example, not less than 30% by mass and not more than 50% by mass relative to the total amount of the adhesion-controlling functional groups, and the content is preferably not less than 35% by mass and not more than 45% by mass from the viewpoint of the improvement in the curability of the adhesive. The content of the self-assembling group is, for example, not less than 5% by mass and not more than 50% by mass relative to the whole amount of the organic polymer, and is preferably not less than 7% by mass and not more than 30% by mass, more preferably not less than 10% by mass and not more than 25% by mass, from the viewpoint of the improvement in the curability of the adhesive. The above-mentioned content of the self-assembling group is preferred since the balance between the curability and the adhesion property to an adherend becomes satisfactory and the adhesion strength of the adhesive can further be improved.

<<Hydrocarbon Group>>

The adhesion-controlling functional group optionally includes a monovalent hydrocarbon group as needed. In this case, the balance between hydrophilicity and hydrophobicity of the organic polymer can be controlled depending on the types of an adherend, and the adhesion properties of the adhesive can be further improved. Examples of the monovalent hydrocarbon group include a linear or branched alkyl group, an alicyclic hydrocarbon group, a linear or branched alkenyl group, a linear or branched alkynyl group and an aromatic hydrocarbon group.

The adhesive properly can be improved while maintaining the compatibility of the organic polymer to a solvent (preferably water) by selecting the monovalent hydrocarbon group in an appropriate manner. A preferred example of the hydrocarbon group is a linear or branched alkyl group, more preferably a linear alkyl group.

The number of carbon atoms in the monovalent hydrocarbon group is, for example, about 3 to 30, preferably about 4 to 15, still more preferably about 5 to 10.

A particularly preferred example of the monovalent hydrocarbon group is specifically a linear alkyl group having 4 to 10 carbon atoms, such as butyl group, pentyl group, hexyl group, heptyl group, octyl group, nonyl group and decyl group. Among these, a linear alkyl group having 4 to 8 carbon atoms is preferred, and a linear alkyl group having 4 to 7 carbon atoms is more preferred.

The content of the hydrocarbon group is, for example, not less than 0% by mass and not more than 10% by mass relative to the total content of the adhesion-controlling functional groups. The hydrocarbon group can be used preferably at a content of not less than 0% by mass and not more than 7% by mass depending on the hydrophobicity of an adherend. The above-mentioned content of the hydrocarbon group is preferred since the adhesion property to an adherend can be improved while maintaining the curability of the adhesive regardless of the types of the adherend, and the bonding strength of the adhesive can further be improved.

The organic polymer according to the present invention preferably has units represented by following general formula (I).

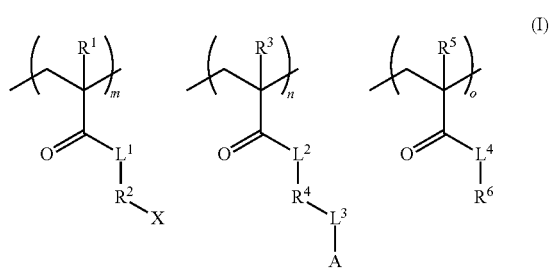

[In general formula (I), $R^1$ represents hydrogen atom or methyl group; $R^2$ represents a hydrocarbon group having 1 to 15 carbon atoms; $L^1$ represents —O— or —NH—; X represents a hydrophilic group; $R^3$ represents hydrogen atom or methyl group; $R^4$ represents hydrocarbon group having 1 to 30 carbon atoms; $L^2$ represents —O— or —NH—; $L^3$ represents a single bond or —CO—; A represents a self-assembling group; $R^5$ represents hydrogen atom or methyl group; $R^6$ represents a hydrocarbon group having 3 to 30 carbon atoms; $L^4$ represents —O— or —NH—; m, n and o respectively represent the abundance ratios of the units; each of m and n represents a numerical value more than 0; and o represents a numeral value not less than 0.]

Examples of $R^2$ includes the same groups as those exemplified as the hydrocarbon group to be substituted by the hydrophilic organic group. Examples of X includes the same groups as those exemplified as the hydrophilic group in the hydrophilic organic group. Examples of $R^4$ includes the same bivalent hydrocarbon groups as those exemplified as the linkage group for the self-assembling group. Examples of $R^6$ are the same groups as those exemplified as the monovalent hydrocarbon group.

As for m, n and o, the ratio m:n is preferably (2 to 20):1, more preferably (5 to 15):1, still more preferably (7 to 13):1, from the viewpoint of the balance between the curability attained by the self-assembling group and the adhesion property to an adherend attained by the hydrophilic organic group. The ratio n:o is preferably 1:(0 to 5), more preferably 1:(0 to 3), still more preferably (0 to 1), particularly preferably 1:(0 to 0.5). The ratio m:n:o is preferably (2 to 20):1:(0 to 5), more preferably (2 to 20):1:(0 to 3), still more preferably (2 to 20):1:(0 to 1). The ratio m:n:o is also preferably (5 to 15):1:(0 to 5), more preferably (5 to 15):1:(0 to 3), particularly preferably (5 to 15):1:(0 to 0.5). The ratio m:n:o is also preferably (7 to 13):1:(0 to 5), more preferably (7 to 13):1:(0 to 3), still more preferably (7 to 13):1:0.

In the case where the hydrocarbon group is adopted, the ratio m:n:o is preferably (2 to 20):1:(0.5 to 3), more preferably (7 to 13):1:(0.7 to 2.6).

A more preferred example of the organic polymer is the one such that $R^1$ represents hydrogen atom or methyl group; $L^1$ represents —O— or —NH—; $R^2$ represents a hydrocarbon group having 1 to 6 carbon atoms: X represents a hydroxy group or an amino group optionally forming an ammonium salt; $R^3$ represents hydrogen atom or methyl group; $L^2$ represents —O— or —NH—; $L^3$ represents —CO—; $R^4$ represents a hydrocarbon group having 3 to 20 carbon atoms; A represents amino acid residue or oligopeptide which contains at least one amino acid selected from alanine, leucine, isoleucine and valine as a constituent amino acid; $R^5$ represents hydrogen atom or methyl group; $L^4$ represents —O— or —NH—; $R^6$ represents a hydrocarbon group having 4 to 10 carbon atoms; and m:n:o satisfies (2 to 20):1:(0 to 3) in general formula (I).

Particularly, a more preferred example of the organic polymer is the one such that $R^1$ represents hydrogen atom or methyl group; $L^1$ represents —O— or —NH—; $R^2$ represents a linear alkylene group having 1 to 4 carbon atoms; X represents a hydroxy group; $R^3$ represents hydrogen atom or methyl group; $L^2$ represents —O— or —NH—; $L^3$ represents —CO—; $R^4$ represents a linear alkylene group having 4 to 8 carbon atoms; A represents an oligopeptide that is an alanine di- to hexa-mer; and m:n:o satisfies (7 to 13):1:(0 to 3) in general formula (I). Such organic polymer has units represented by general formula (II) shown below.

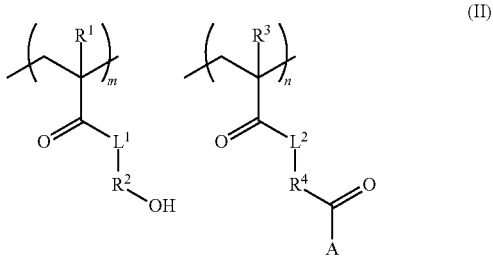

(II)

[In general formula (II), $R^1$ represents hydrogen atom or methyl group; $L^1$ represents —O— or —NH—; $R^2$ represents a linear alkylene group having 1 to 4 carbon atoms; $R^3$ represents hydrogen atom or methyl group; $L^2$ represents —O— or —NH—; $R^4$ represents a linear alkylene group having 4 to 8 carbon atoms; A represents an oligopeptide that is an alanine di- to hexa-mer; m and n respectively represent the abundance ratios of the units; each of m and n represents a numerical value more than 0; and m:n satisfies (7 to 13):1.]

The number average molecular weight of the organic polymer is, for example, preferably not less than 5,000, more preferably not less than 20,000, still more preferably not less than 30,000, particularly preferably not less than 50,000. The number average molecular weight of the organic polymer is preferably not more than 500,000, more preferably not more than 200,000, still more preferably not more than 100,000. A larger molecular weight is advantageous for crosslinking/gelatinization and can lead to better curability of the adhesive in water or under wet conditions. When the organic polymer does not have a too large molecular weight, the solubility of the organic polymer in a solvent becomes better and the viscosity of a resultant solution can be suppressed. The number average molecular weight of the organic polymer can be calculated by gel permeation chromatography on the basis of a calibration curve produced with pullulan as a reference sample.

<<Method for Producing Organic Polymer>>

The organic polymer according to the present invention is produced by a production method comprising copolymerizing a first monomer wherein a hydrophilic organic group is bonded to a monomer of which homopolymer is a water-soluble polymer with a second monomer wherein a self-assembling group is bonded to a monomer of which homopolymer is a water-soluble polymer. In this manner, it becomes possible to produce an organic polymer having a water-soluble polymer unit and adhesion-controlling functional groups with a desired content ratio, even when the reactivity between the individual adhesion-controlling functional groups and a monomer that is a the water-soluble polymer precursor are different from each other. The monomer of which homopolymer is a water-soluble polymer is preferably (meth)acrylic acid or (meth)acrylamide. In addition to the first monomer and the second monomer, a third monomer in which a hydrocarbon group is bonded to a monomer of which homopolymer is a water-soluble polymer may also be copolymerized together.

The first monomer having a hydrophilic organic group bonded thereto is preferably represented by general formula (m1) shown below.

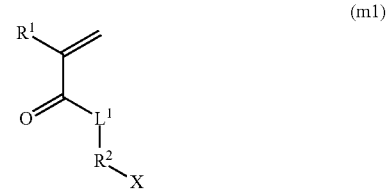

(m1)

[In general formula (m1), $R^1$, $R^2$, $L^1$ and X represent the same groups as described above.]

The second monomer having a self-assembling group bonded thereto is preferably represented by general formula (m2) shown below.

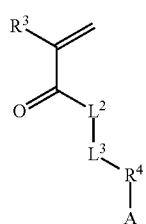

(m2)

[In general formula (m2), $R^3$, $R^4$, $L^2$, $L^3$ and A represent the same groups as described above.]

The third monomer having a hydrocarbon group bonded thereto is preferably represented by general formula (m3).

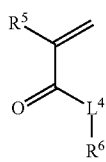

(m3)

[In general formula (m3), $R^5$, $R^6$ and $L^4$ represent the same groups as described above.]

As the method for polymerizing the first monomer, the second monomer and the third monomer each having an adhesion-controlling functional group introduced thereinto, any known method can be employed, and a radical polymerization method is preferred from the viewpoint of controlling reactivity. As an initiator, a peroxide initiator, such as benzoyl peroxide, an azo compound initiator such as azobisisobutyronitrile and the like can be used. The use of an azo compound initiator such as azobisisobutyronitrile is preferred since polymerization stability becomes excellent.

If there is a potential that the adhesion-controlling functional groups may cause an undesired reaction during the polymerization reaction, the adhesion-controlling functional groups may be protected with corresponding protecting groups in a step prior to the polymerization (preferably prior to the introduction into the monomer) and the protecting groups may be deprotected after the polymerization reaction. As the protecting group for a hydroxy group, for example, a benzyl group, a tert-butyl group, a methoxymethyl group and the like can be used, and as the protecting group for an amino group optionally forming an ammonium salt, a tert-butoxycarbonyl group, a benzyl oxy carbonyl group and the like can be used.

As the method for producing the first monomer by introducing a hydrophilic organic group into a monomer of which homopolymer is a water-soluble polymer, a method can be employed where hydroxy or amino group is introduced into a terminal of the hydrophilic organic group and then the resultant product is reacted with a (meth)acryloyl halide (preferably (meth)acryloyl chloride) in the case where (meth)acrylic acid or (meth)acrylamide is used as the monomer of which homopolymer is a water-soluble polymer. A strong base such as triethylamine may be co-existed if needed. As the solvent, a ketone-type solvent such as tetrahydrofuran can be used preferably.

As the method for producing the second monomer by introducing a self-assembling group into a monomer of which homopolymer is a water-soluble polymer, the same method as that employed for the introduction of the hydrophilic organic group can be employed in the case where (meth)acrylic acid or (meth)acrylamide is used as the monomer of which homopolymer is a water-soluble polymer. Particularly, in the case where an amino acid residue or an oligopeptide is adopted as the self-assembling group and the self-assembling group is bonded to the water-soluble polymer through a hydrocarbon group or the like, a compound having a carboxy group at one terminal of a hydrocarbon group contained therein and also having a (meth)acryloyloxy group or a (meth)acryloylamino group at the other terminal may be used. Specifically, the N-terminal of an amino acid residue or an oligopeptide that serves as the self-assembling group may be reacted with the carboxy group in the compound. Examples of such a compound include 6-acryloyl alkanoic acid and 6-acryloylaminoalkanoic acid. In the reaction of the N-terminal of the amino acid residue or the oligopeptide with the carboxy group, a carboxylic acid activator such as N-hydroxysuccinimide may be used.

As the method for producing the third monomer by introducing a hydrocarbon group into a monomer of which homopolymer is a water-soluble polymer, the same method as that employed for the introduction of the hydrophilic organic group or the self-assembling group can be employed in the case where (meth)acrylic acid or (meth)acrylamide is used as the monomer of which homopolymer is a water-soluble polymer. For example, a method can be employed of introducing a hydroxy group or an amino group into the N-terminal of the hydrocarbon group and then reacting the resultant product with a (meth)acryloyl halide (preferably (meth)acryloyl chloride).

<<Curing Agent>>

The adhesive according to the present invention contains a curing agent to accelerate the self-assembly of the self-assembling group, and it becomes possible to let the adhesive cure by inducing a crosslinked structure by the self-assembling group. As the curing agent, an amidating agent, a chelating agent, an electrolyte and the like can be used.

The amidating agent comprises a group capable of acting on a terminal (preferably the C-terminal) of the self-assembling group to form an amide bond, and a monovalent hydrocarbon group. When the organic polymer and the amidating agent is allowed to co-exist, the self-assembly of the self-assembling group is accelerated and a hydrophobic interaction between a hydrocarbon group in the amidating agent and the hydrocarbon group in the organic polymer occurs, and therefore the matrix strength of the resultant adhesive becomes further improved.

Examples of the amidating agent include a primary alkylamine having a linear or branched alkyl group, a primary alkenylamine having a linear or branched alkenyl group, and a primary alkynylamine having a linear or branched alkynyl group. From the viewpoint of the improvement in curability, a primary alkylamine having a linear or branched alkyl group is preferred, and a primary alkylamine having a linear alkyl group is more preferred.

In the case where the amidating agent is used, a condensing agent may co-exist. When a condensing agent co-exists, the reliability of the formation of the amide bond can be improved. As the condensing agent, known condensing agent can be used, and for example, a water-soluble carbodiimide such as 1-ethyl-3-(3-dimethylaminopropyl)carbodiimide hydrochloride can be used preferably.

In the case where the condensing agent is used, the amount of the condensing agent to be used is preferably not less than 1 part by mass and not more than 10 parts by mass, more preferably not less than 1.5 parts by mass and not more than 8 parts by mass, still more preferably not less than 2 parts by mass and not more than 7 parts by mass, relative to 1 part by mass of the amidating agent.

In the case where the terminal of the self-assembling group is the C-terminal, a carboxylic acid activator may also be used. As the carboxylic acid activator, known compound can be used, and for example, N-hydroxysuccinimide, N-hydroxysulfosuccinimide, 1-hydroxybenzotriazole, 1-hydroxy-7-azabenzotriazole, and pentafluorophenol are exemplified. Among these compounds. N-hydroxysuccinimide is preferred.

In the case where the carboxylic acid activator is used, the amount of the carboxylic acid activator to be used is preferably not less than 50 parts by mass and not more than 150 parts by mass, more preferably not less than 70 parts by mass and not more than 130 parts by mass, still more preferably not less than 80 parts by mass and not more than 120 parts by mass, relative to 100 parts by mass of the amidating agent.

In the case where the condensing agent and the carboxylic acid activator are used, the condensing agent and the carboxylic acid activator are also included in the curing agent.

The chelating agent is a compound containing a metal ion with which the self-assembling group (preferably an oligopeptide) can coordinate. For example, an alkali metal salt, an alkali earth metal salt and a transition metal salt can be used. The term "a transition metal" as used herein refers to an element belonging to Group 3 to Group 12. In the case where the chelating agent co-exists with the organic polymer, a stronger crosslinked structure can be formed as the result of the coordination of the self-assembling group (preferably an oligopeptide) with the metal ion, in addition to the self-assembly of the self-assembling group, and therefore the curing of the adhesive can be accelerated and the matrix strength of the adhesive can be further improved.

The metal species of the metal ion may be selected as appropriate on the basis of the complex formation ability between the self-assembling group and each of the metal depending on the desired curing accelerating degree, and is preferably a bivalent metal, more preferably a bivalent alkali earth metal, particularly preferably calcium. As the salt, known metal salt such as a chloride salt, a sulfate salt, an acetate salt, a carbonate salt, a phosphate salt, a hydrochloride salt and a hydrogen carbonate salt may be used, and the salt may be selected as appropriate from the viewpoint of improving the curability of the adhesive.

The term "an electrolyte" refers to a substance that can be ionized into a cation and an anion in a solvent (preferably water). When the electrolyte co-exists with the organic polymer, the self-assembling behavior of the self-assembling group can be controlled and the resultant adhesive can cure regardless of the types of the self-assembling group.

The electrolyte may be any one of an acid, a base and a salt, and can be selected as appropriate from the viewpoint of controlling the curability of the adhesive. The electrolyte is preferably a salt, and is preferably an inorganic salt such as sodium chloride.

Among these curing agents, an amidating agent is preferred.

In the adhesive, the content of the curing agent is preferably not less than 1% by mass and not more than 50% by mass, more preferably not less than 5% by mass and not more than 45% by mass, still more preferably not less than 10% by mass and not more than 40% by mass, relative to the whole amount of the adhesive.

The adhesive according to the present invention can be used preferably as a liquid adhesive by dissolving or dispersing the adhesive in a proper solvent. As the solvent, water is preferred from the viewpoint of the curability of the adhesive, and alternatively, water may be used in combination with a water-soluble organic solvent. As the water-soluble organic solvent, an alcohol-type solvent such as methanol, ethanol, propanol, butanol and 2-methyl-2-propanol; a ketone-type solvent such as acetone, methyl ethyl ketone and diethyl ketone; an amide-type solvent such as acetamide and dimethylformamide; and the like can be used. The content of water may be preferably not less than 90% by mass, more preferably not less than 95% by mass, still more preferably not less than 99% by mass, particularly preferably 100% by mass, relative to 100% by mass of the solvent to be used in the liquid adhesive.

The amount of the adhesive (comprising the organic polymer and the curing agent) to be used in the liquid adhesive is not particularly limited, and for example, is not less than 2% by mass and not more than 50% by mass relative to 100% by mass of the resultant liquid adhesive, and is preferably not less than 3% by mass and not more than 20% by mass, preferably not less than 5% by mass and not more than 15% by mass, from the viewpoint of improving curability of the adhesive.

The adhesive according to the present invention can adhere by applying the adhesive onto adherend and then pressure-bonding the adherend, for example. The adhesive may be applied at a thickness, for example, of about 0.1 to 5 mm, and the curability of the adhesive can be developed most effectively. The pressure to be employed for the compression may be any one, as long as the adherend can be fixed. The state of the bonding can be evaluated, for example, by drawing at least two bonded materials in the opposite directions to apply a shear stress and then determining a stress generated upon breakage.

The adhesive according to the present invention can be applied to various materials including metals such as aluminum, iron and nickel; a concrete; a cell; a protein; and a resin such a hydrophobic resin including a polyethylene resin and the like and a hydrophilic resin including an acrylic resin, a nylon resin and the like, and it is useful in various use applications including a medical adhesive (an adhesive for implantation use) and an adhesive for the bonding of the surface of a material (e.g., a concrete, a metal) under wet conditions or in water.

It should be noted that the present application claims the benefit of priority based on Japanese Patent Application No. 2013-175020 which was filed on Aug. 26, 2013. The entire contents of the description of Japanese Patent Application No. 2013-175029, filed on Aug. 26, 2013, are incorporated herein by reference.

EXAMPLES

Hereinafter, the present invention is described by examples in more detail. However, the present invention is not intended to be limited by the following examples, and it is also obviously possible to implement the invention by appropriately changing it within a range meeting the gists described above and later of the examples, all of which are encompassed within the technical scope of the invention. In the following, "part" means "part by mass" and "%" means "% by mass" unless otherwise specified.

(Measurement of Tensile Shear Fracture Strength)

A 10 mg of 10% aqueous solution of an organic polymer was applied onto a 10 mm×10 mm region on a stainless steel plate so that the adhesive was sandwiched by two stainless steel plates. The resultant product was fixed with a clip, and was allowed to stand for 24 hours at room temperature under highly humid conditions (humidity: 80%) to bond the stainless steel plates to each other. Both ends of the bonded stainless steel plates were fixed onto a tensile tester, then the sample was drawn at a speed of 1.0 mm/min, and then the load was measured. The tensile shear fracture strength was determined in accordance with the formula shown below, with the load applied upon the detachment of the stainless steel plates and the bonded area.

Tensile shear fracture strength (kPa)=load (N)/bond area $(m^2) \times 10^{-3}$

In addition, the measurement was carried out in the same manner as mentioned above, except that polyethylene plates, poly(methyl methacrylate) (PMMA) plates and 6-nylon plates were used as substrates in place of the stainless steel plates to determine the tensile shear fracture strength thereof. In this experiment, all of the substrates were not pre-treated at the time of the application of the organic polymer.

(Measurement of Molecular Weight)

The measurement of the molecular weight of a polymer electrolyte that constitutes a membrane electrode assembly was carried out by gel permeation chromatography (GPC).

In the measurement, an organic polymer (4 mg) was dissolved in an aqueous 0.1 M sodium carbonate solution (8 mL) as mobile phase solvent, and the measurement was carried out under the following conditions. A measurement value was converted into a molecular weight on the basis of a calibration curve produced using pullulan as a reference sample. In this manner, the weight average molecular weight and the number average molecular weight of the polymer electrolyte were calculated. The GPC conditions employed in the measurement are as in the following.

Mobile phase: 0.1 M aqueous sodium carbonate solution
Flow rate: 0.8 ml/min
Device: Shimadzu Prominence HPLC system
Columns: TSKgel G4000PWXL, TSKgel G5000PWXL (NMR Spectroscopy)

The obtained organic polymers were subjected to $^1$H-NMR spectroscopy. The measurement was carried out at 25° C. using "AV400N" by Bruker Corporation as a device. Heavy water was used as a solvent, and the concentration of each sample was 15 mg/mL.

(FT-IR Spectroscopy)

The obtained organic polymers were subjected to FT-IR spectroscopy by a KBr pellet method. As a device, "VERTEX70" by Bruker Corporation was used.

(Synthetic Example 1): Production of Monomer Containing Self-Assembling Group

Step 1

Production of N-α-(9-fluorenylmethoxycarbonyl)-di-L-alanine tert-butyl ester (Fmoc-Ala-Ala-OtBu)

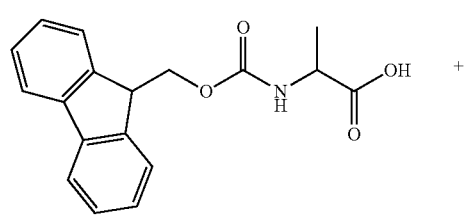

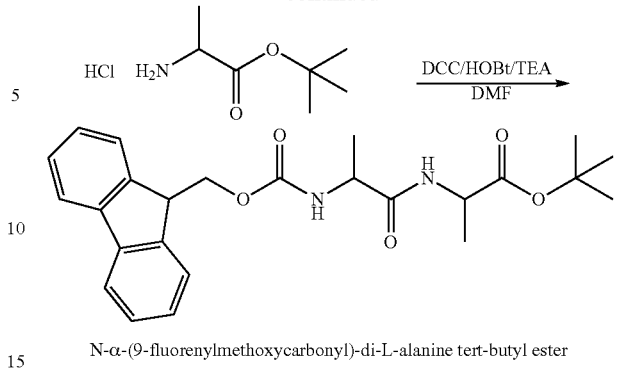

N-α-(9-fluorenylmethoxycarbonyl)-di-L-alanine tert-butyl ester

N-α-(9-Fluorenylmethoxycarbonyl)-L-alanine (Fmoc-Ala-OH) (10.0 g) (30.4 mmol) and 1-hydroxybenzotriazolemonohydrate (HOBt) (5.59 g) (30.4 mmol) were dissolved in dimethylformamide (DMF) (60 ml), and the resultant solution was cooled on an ice bath. N,N'-Dicyclohexylcarbodiimide (DCC) (6.90 g) (33.4 mmol) was added to the cooled solution, and the resultant solution was stirred at 0° C. for 1 hour. Subsequently, L-alanine tert-butyl ester (H-Ala-OtBu) (5.59 g) (30.4 mmol) and trimethylamine (TEA) (4.21 ml) (30.4 mmol) were added to the solution, and the resultant solution was stirred at room temperature for 14 hours. The reaction solution was filtrated to remove precipitates, and the resultant solution was concentrated under a reduced pressure. The residue was dissolved in ethyl acetate, then washed with 1N hydrochloric acid, a saturated sodium hydrogen carbonate solution, and saturated sodium chloride solution. The resultant solution was dried over sodium sulfate. After filtrating the resultant solution, the solvent was distilled out from the filtrate under a reduced pressure, and then re-crystallization from the residue was carried out with a mixture solvent of hexane and ethyl acetate, thereby producing the objective substance (Fmoc-Ala-Ala-OtBu) (11.0 g) (27.3 mmol). The production of the desired compound was confirmed by $^1$H-NMR spectroscopy.

$^1$H-NMR (400 MHz, CDCl$_3$, δ ppm); 7.76 (2H, d, J=7.5), 7.59 (2H, d, J=7.3), 7.40 (2H, t, J=7.4), 7.31 (2H, dt, J=1.0, 7.4), 6.42 (1H, d, J=6.7), 5.41 (1H, d, J=7.0), 4.39-4.47 (3H, m), 4.22 (2H, t, J=7.0), 1.46 (9H, s), 1.41 (3H, d, 6.8), 1.38 (3H, d, 7.1)

Step 2

Production of N-α-(9-fluorenylmethoxycarbonyl)-tri-L-alanine tert-butyl ester (Fmoc-Ala-Ala-Ala-OtBu)

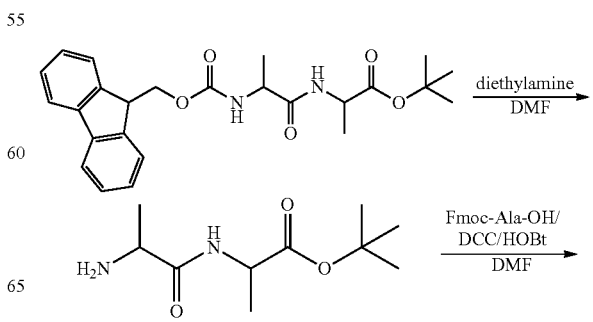

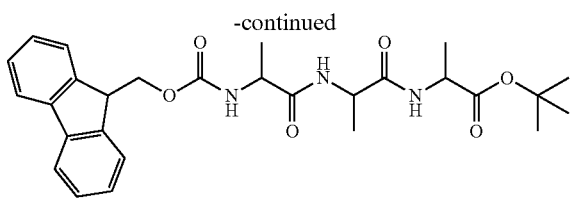

N-α-(9-fluorenylmethoxycarbonyl)-tri-L-alanine tert-butyl ester

Fmoc-Ala-Ala-OtBu (8.02 g) (18.3 mmol) was dissolved in DMF (180 ml), then diethylamine (DEA) (18 ml) was added to the solution, then the resultant solution was stirred at room temperature for 1.5 hours, and the reaction solution was concentrated under a reduced pressure, thereby producing di-L-alanine tert-butyl ester (H-Ala-Ala-OtBu). Further, Fmoc-Ala-OH (6.08 g) (18.3 mmol) and HOBt (3.38 g) (22.0 mmol) were dissolved in DMF (32 ml), then DCC (4.20 g) (20.1 mmol) was added to the solution, and the resultant solution was stirred for 1 hour under ice cooled conditions. Previously synthesized H-Ala-Ala-OtBu was dissolved in DMF (8 ml), then the solution was added to the reaction solution, and the resultant solution was stirred at room temperature for 14 hours. The reaction solution was filtrated to remove precipitates, and then the resultant solution was concentrated to dryness under a reduced pressure, thereby producing a solid material. The solid material was washed with 1N hydrochloric acid and a saturated sodium hydrogen carbonate solution, and re-crystallization from mixture solution of ethyl acetate and hexane was carried out, thereby producing the objective substance (Fmoc-Ala-Ala-Ala-OtBu) (6.89 g) (13.5 mmol). The production of the objective substance was confirmed by $^1$H-NMR spectroscopy.

$^1$H-NMR (400 MHz, CDCl$_3$, δ ppm); 7.77 (2H, d, J=7.5), 7.59 (2H, d, J=7.5), 7.40 (2H, t, J=7.5), 7.31 (2H, dt, J=1.1, 7.4), 6.59 (1H, d, J=7.6), 6.55 (1H, d, J=6.8), 5.42 (1H, d, J=6.3), 4.40-4.52 (4H, m), 4.20-4.28 (2H, m), 1.46 (9H, s), 1.40 (6H, d, 7.0), 1.36 (3H, d, 7.1)

Step 3

Production of N-α-(9-fluorenylmethoxycarbonyl)-tetra-L-alanine tert-butyl ester (Fmoc-Ala-Ala-Ala-Ala-OtBu)

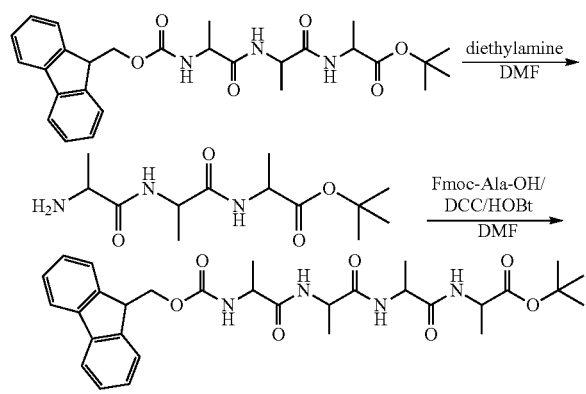

N-α-(9-fluorenylmethoxycarbonyl)-tetra-L-alanine tert-butyl ester

Fmoc-Ala-Ala-Ala-OtBu (3.00 g) (5.89 mmol) was dissolved in DMF (50 ml), next DEA (5 ml) was added to the solution, then the resultant solution was stirred at room temperature for 2 hours, and the reaction solution was concentrated under a reduced pressure, thereby producing tri-L-alanine tert-butyl ester (H-Ala-Ala-Ala-OtBu). Further. Fmoc-Ala-OH (2.13 g) (6.48 mmol) and HOBt (1.09 g) (7.07 mmol) were dissolved in DMF (10 ml), next DCC (1.46 g) (7.07 mmol) was added to the solution, and then the resultant solution was stirred for 1 hour under ice cooled conditions. Previously synthesized H-Ala-Ala-Ala-OtBu was dissolved in DMF (5 ml), then the resultant solution was added to the reaction solution, and the resultant solution was stirred at room temperature for 14 hours. DMF (20 ml) was added to the reaction solution since the solution was gelated during the procedure. The reaction solution was filtrated to remove precipitates, and then DMF was concentrated under a reduced pressure, thereby producing a crude product. The crude product was re-crystallized from chloroform, thereby producing the objective substance (Fmoc-Ala-Ala-Ala-Ala-OtBu) (2.77 g) (4.77 mmol). The production of the objective substance was confirmed by $^1$H-NMR spectroscopy.

$^1$H-NMR (400 MHz, DMSO-d6, δ ppm); 8.16 (1H, d, J=7.0), 7.99 (1H, d, J=7.0), 7.90-7.87 (3H, m), 7.72 (2H, t, J=7.1), 7.54 (1H, d, J=7.6), 7.42 (2H, dt, J=0.8, 7.5), 7.33 (2H, dt, J=1.1, 7.4), 4.19-4.31 (5H, m), 4.01-4.12 (2H, m), 1.38 (9H, s), 1.19-1.25 (12H, m)

Step 4

Production of N-succinimidyl 6-acryamtdehesanolate (AAm-Hex-Suc)

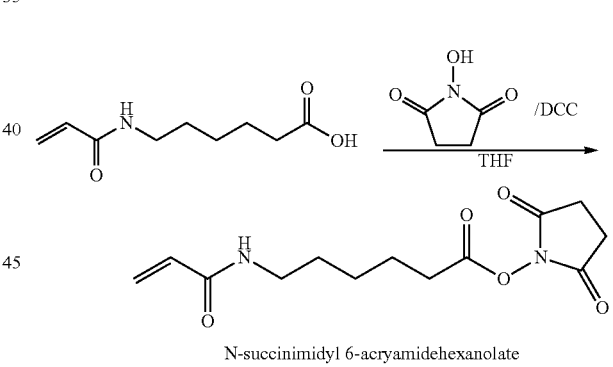

N-succinimidyl 6-acryamidehexanolate

6-Acrylamidehexanoic acid (3.00 g) (16.2 mmol) and N-hydroxysuccinimide (1.86 g) (16.2 mmol) were dissolved in tetrahydrofuran (THF) (15 ml), and the resultant solution was cooled on an ice bath. A solution of DCC (3.68 g) (17.8 mmol) in THF (15 ml) was added dropwise to the cooled solution, and the resultant reaction solution was stirred at 0° C. for 12 hours. The reaction solution was filtrated to remove precipitates, and the resultant solution was concentrated under a reduced pressure. The residue was dissolved in ethyl acetate, and the resultant solution was washed with 1N hydrochloric acid, saturated sodium hydrogen carbonate solution and saturated sodium chloride solution, and the washed solution was dried over sodium sulfate. After the filtration, the solvent was distilled out under a reduced pressure, and then re-crystallization from the residue was carried out from mixture solvent of hexane and ethyl acetate, thereby producing the objective substance (AAm-Hex-Suc)

(2.81 g) (9.95 mmol). The production of the desired compound was confirmed by ¹H-NMR spectroscopy.

¹H-NMR (400 MHz, CDCl3, δ ppm): 6.28 (1H, dd, J=1.6, 17.0) 6.13 (1H, dd, J=10.2, 17.0), 5.86 (1H, s), 5.63 (1H, dd, J=1.6, 10.2), 3.36 (2H, dd, J=6.6, 12.6), 2.85 (4H, s), 2.63 (2H, t, J=7.1), 1.80 (2H, tt, J=7.2, 7.5), 1.56-1.64 (2H, m), 1.46-1.52 (2H, m)

Step 5

Production of 6-acrylamidehexanoate tetra-L-alanine tert-butyl ester (AAm-Hex-Ala-Ala-Ala-Ala-OtBu)

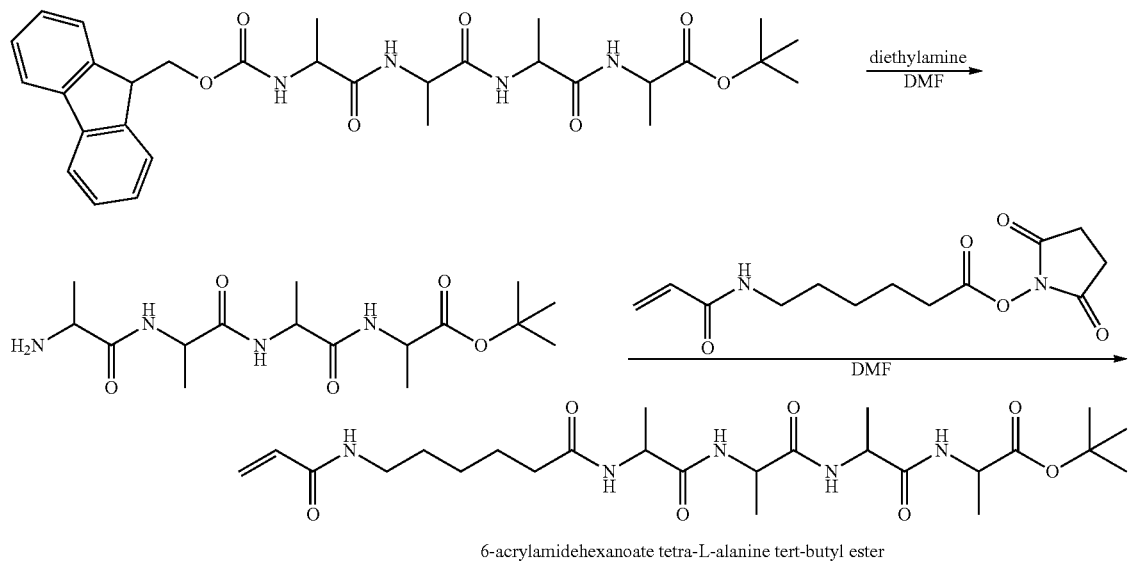

6-acrylamidehexanoate tetra-L-alanine tert-butyl ester

Fmoc-Ala-Ala-Ala-Ala-OtBu (2.70 g) (4.65 mmol) was dissolved in DMF (50 ml), next DEA (5 ml) was added to the solution, then the resultant solution was stirred at room temperature for 2 hours, and the resultant reaction solution was concentrated under a reduced pressure, thereby producing tetra-L-alanine tert-butyl ester (H-Ala-Ala-Ala-Ala-OtBu). The product was dissolved in DMF (50 ml), then AAm-Hex-Suc (1.44 g) (5.11 mmol) was added to the resultant solution, and the solution was stirred at room temperature for 14 hours. The reaction solution was concentrated to one-third volume to the original volume under a reduced pressure, then ether (200 ml) was added to the concentrate, and precipitates were collected and dried, thereby producing a self-assembling group-containing monomer (AAm-Hex-Ala-Ala-Ala-Ala-OtBu) (2.26 g) (4.30 mmol). The production of the desired compound was confirmed by ¹H-NMR spectroscopy.

¹H-NMR (400 MHz, DMSO-d6, δ ppm); 8.14 (1H, d, J=7.0), 8.05 (1H, t, J=5.2), 7.99 (1H, d, J=7.3), 7.94 (1H, d, J=7.4), 7.87 (1H, d, J=7.7), 6.20 (1H, dd, J=10.1, 17.1), 6.05 (1H, dd, J=2.4, 17.1), 5.55 (1H, dd, J=2.3, 10.0), 4.19-4.31 (3H, m), 4.05-4.12 (1H, m), 3.10 (2H, dd, J=6.9, 12.7), 2.10 (2H, t, J=7.4), 1.38-1.54 (14H, m), 1.17-1.27 (15H, m)

Example 1

N-(2-Hydroxyethyl)acrylamide (0.574 g) (4.99 mmol), the self-assembling group-containing monomer produced in Synthetic Example 1 (0.264 g) (0.502 mmol) and 2,2'-azobis(isobutyronitrile) (20.4 mg) (0.124 mmol) were dissolved in a mixture solution of dimethylacetamide (10 ml) and methanol (1 ml), and then the freezing and thawing of the resultant solution was repeated three times under vacuum (0.1 Pa) to remove oxygen from the solution. Subsequently, the reaction solution was sealed under vacuum (0.1 Pa) and then stirred at 60° C. for 16 hours. Subsequently, the reaction solution was poured into diethyl ether, next precipitates produced were collected, then washed with diethyl ether repeatedly and dried under a reduced pressure, thereby producing a precursor polymer 1 in which a carboxy group was protected (0.792 g). A portion (0.740 g) of the precursor polymer 1 was dissolved in trifluoroacetic acid (30 ml), and then the resultant solution was reacted for 3 hours to remove the protecting group. Trifluoroacetic acid was distilled out from the solution under a reduced pressure, then the resultant solution was poured into diethyl diether, and precipitates produced were collected. The precipitates were dissolved in water, then dialyzed and lyophilized, thereby producing an organic polymer 1 according to the present invention (0.602 g). The organic polymer had a weight average molecular weight of 101,000 and a number average molecular weight of 36,000.

A portion (20 parts) of the organic polymer 1 was mixed with deionized water so as to produce a solution containing the organic polymer 1 at a concentration of 10% by mass, and then the resultant solution was mixed with hexylamine (1.2 parts) as a curing agent, 1-ethyl-3-(3-dimethylaminopropyl)carbodiimide hydrochloride (6.5 parts) as a condensing agent and N-hydrosuccinimide (1.3 parts) as a carboxylic acid activator, thereby preparing an adhesive 1 according to the present invention.

Example 2

The same procedure as in Example 1 was carried out, except that N-(2-hydroxyethylacrylamide) (0.518 g) (4.50 mmol), the self-assembling group-containing monomer produced in Synthetic Example 1 (0.264 g) (0.502 mmol), N-hexylacrylamide (83.0 mg) (0.535 mmol) and 2,2'-azobis(isobutyronitrile) (37.0 mg) (0.225 mmol) were dissolved, in place of N-(2-hydroxyethyl)acrylamide (0.574 g) (4.99 mmol), the self-assembling group-containing monomer produced in Synthetic Example 1 (0.264 g) (0.502 mmol) and 2,2'-azobis(isobutyronitrile) (20.4 mg) (0.124 mmol), in a mixture solution of dimethylacetamide (10 ml) and methanol (1 ml), thereby producing a precursor polymer 2 (0.644 g). A portion (0.600 g) of the precursor polymer 2 was dissolved in trifluoroacetic acid (30 ml), and then the resultant solution was reacted for 3 hours to remove the protecting group. Trifluoroacetic acid was distilled out from the solution under a reduced pressure, then the resultant solution was poured into diethyl diether, and then precipitates produced were collected. The precipitates were dissolved in water, then dialyzed and lyophilized, thereby producing an organic polymer 2 according to the present invention (0.431 g). The organic polymer 2 had a weight average molecular weight of 24,900 and a number average molecular weight of 8,800.

The organic polymer 2 was subjected to NMR spectroscopy. As a result, a peak which derives from terminal methyl group ($CH_3$) in hexyl was confirmed at 0.7 ppm, a peak which derives from methyl group in alanine was confirmed at 1.2 ppm, a peak which derives from main chain acrylamide was confirmed at 1.2 to 2 ppm, a peak which derives from ethyl group was confirmed at 3 ppm, a peak which derives from methylene group ($CH_2$) having a hydroxy group bonded thereto was confirmed at 3.5 ppm, a peak which derives from α-hydrogen in alanine (4 atoms per a structural unit) was confirmed at 4.1 ppm, a peak which derives from hydroxy group was confirmed at 5 ppm, and a peak which derives from amide proton was confirmed at 7 to 8 ppm, as shown in FIG. 1.

The relative amount of a structural unit having a hydrophilic organic group was determined from a numerical value produced by dividing a peak area value of the peak (3.5 ppm) which derives from methylene group ($CH_2$) having hydroxy group bonded thereto by the number of protons (2), the relative amount of a structural unit having a self-assembling group was determined from a numerical value produced by dividing a peak area value of the peak (4.1 ppm) which derives from α-hydrogen in alanine (4 atoms per a structural unit) by the number of protons (4), the relative amount of a structural unit having hydrocarbon group was determined from a numerical value produced by dividing the peak area value of the peak (0.7 ppm) which derives from a terminal methyl group ($CH_3$) in hexyl by the number of protons (3), and the ratio among the relative amounts, i.e., m:n:o, was calculated. Specifically, m:n:o= (4.0/2):(0.8064/4):(0.6076/3)≈10:1:1.

The organic polymer 2 was subjected to FT-IR spectroscopy. As a result, a peak which derives from an amide bond (a C=O stretching vibration, an N—H vending vibration, a C—N stretching vibration) was confirmed at 1500 to 3700 $cm^{-1}$, and a peak which derives from a C—H stretching vibration was confirmed at 2900 $cm^{-1}$.

A portion (19 parts) of the organic polymer 2 was mixed with deionized water so as to produce a solution containing the organic polymer 2 at a concentration of 10% by mass, and then the resultant solution was mixed with hexylamine (1.1 parts) as a curing agent, 1-ethyl-3-(3-dimethylaminopropyl)carbodiimide hydrochloride (6.0 parts) as a condensing agent and N-hydrosuccinimide (1.3 parts) as a carboxylic acid activator, thereby preparing an adhesive 2 according to the present invention.

Example 3

The same procedure as in Example 1 was carried out, except that N-(2-hydroxyethyl)acrylamide (0.461 g) (4.01 mmol), the self-assembling group-containing monomer produced in Synthetic Example 1 (0.262 g) (0.499 mmol), N-hexylacrylamide (0.157 g) (1.01 mmol) and 2,2'-azobis (isobutyronitrile) (38.2 mg) (0.233 mmol) were dissolved, in place of N-(2-hydroxyethyl)acrylamide (0.574 g) (4.99 mmol), the self-assembling group-containing monomer produced in Synthetic Example 1 (0.264 g) (0.502 mmol) and 2,2'-azobis(isobutyronitrile) (20.4 mg) (0.124 mmol), in a mixture solution of dimethylacetamide (10 ml) and methanol (1 ml), thereby producing a precursor polymer 3 (0.799 g). A portion (0.747 g) of the precursor polymer 3 was dissolved in trifluoroacetic acid (40 ml), and then the reaction of the resultant solution and the purification were carried out under the above-mentioned conditions, thereby producing an organic polymer 3 (0.710 g). The organic polymer 3 had a weight average molecular weight of 30,500 and a number average molecular weight of 11,000.

A portion (11 parts) of the organic polymer 3 was mixed with deionized water so as to produce a solution containing the organic polymer 3 at a concentration of 10% by mass, and then the resultant solution was mixed with hexylamine (0.62 parts) as a curing agent, 1-ethyl-3-(3-dimethylaminopropyl)carbodiimide hydrochloride (3.7 parts) as a condensing agent and N-hydrosuccinimide (0.83 parts) as a carboxylic acid activator, thereby preparing an adhesive 3 according to the present invention.

The adhesives 1 to 3 were subjected to a tensile shear fracture strength measurement. The results are shown in Table 1. It was found that the adhesives according to the present invention exerted adhesion properties even under highly humid conditions and acted as excellent in-water adhesives. Particularly, it was found that the adhesion properties of the adhesives to 6-nylon and poly(methyl methacrylate), both of which are hydrophilic resins, were improved by introducing a hydrocarbon group into each of the organic polymers.

|  | Organic Polymer No. | m:n:o | tensile shear fracture strength/kPa | | | |
|---|---|---|---|---|---|---|
|  |  |  | stainless steel plate | polyethylene plate | poly(methyl methacrylate) plate | 6-nylon plate |
| Example 1 | Organic Polymer 1 | 10:1:0 | 24 | 128 | 91 | 74 |
| Example 2 | Organic Polymer 2 | 10:1:1 | 24 | 132 | 402 | 283 |
| Example 3 | Organic Polymer 3 | 9.4:1:2.2 | 18 |  | 503 |  |

INDUSTRIAL APPLICABILITY

The adhesive according to the present invention is useful in various use applications including a medical adhesive (an adhesive for implantation use) and an adhesive for the bonding of the surface of a material (e.g., a concrete, a metal) under wet conditions or in water.

The invention claimed is:
1. An adhesive comprising:
an organic polymer having
a main chain formed by a water-soluble polymer unit, and
a hydrophilic organic group and a self-assembling group bonded to the water-soluble polymer unit; and a curing agent,
wherein the self-assembling group is bonded to the water-soluble polymer unit through at least a divalent hydrocarbon group as a linkage group, and
wherein the curing agent is an amidating agent, a chelating agent, or an electrolyte.

2. The adhesive according to claim 1, wherein the hydrocarbon group is bonded to the water-soluble polymer unit.

3. The adhesive according to claim 1, wherein the water-soluble polymer is poly((meth)acrylic acid) or poly((meth)acryl amide), and the hydrophilic organic group, the self-assembling group or the hydrocarbon group is bonded to a side chain of the poly((meth)acrylic acid) or the (meth)acryl amide.

4. The adhesive according to claim 1, wherein the hydrophilic organic group is a hydrocarbon group substituted by a hydrophilic group.

5. The adhesive according to claim 1, wherein the self-assembling group is an amino acid residue or an oligopeptide.

6. The adhesive according to claim 1, wherein the content of the self-assembling group is not less than 5% by mass and not more than 50% by mass relative to the whole amount of the organic polymer.

7. The adhesive according to claim 5, wherein an amino acid that constitutes the amino acid residue or the oligopeptide in the self-assembling group comprises at least one amino acid selected from the group consisting of alanine, leucine, isoleucine and valine.

8. The adhesive according to claim 4, wherein the hydrophilic group is a hydroxy group or an amino group optionally forming an ammonium salt.

9. The adhesive according to claim 1, wherein the organic polymer has units represented by formula (I):

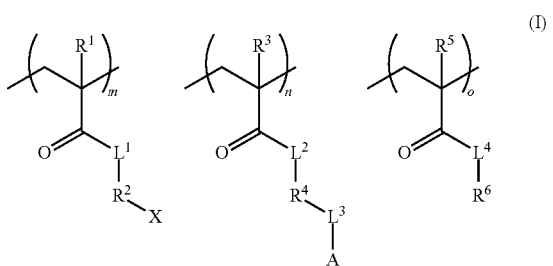

wherein $R^1$ represents a hydrogen atom or a methyl group; $R^2$ represents a hydrocarbon group having 1 to 15 carbon atoms; $L^1$ represents —O— or —NH—; X represents a hydrophilic group; $R^3$ represents a hydrogen atom or a methyl group; $R^4$ represents a hydrocarbon group having 1 to 30 carbon atoms; $L^2$ represents —O— or —NH—; $L^3$ represents a single bond or —CO—; A represents a self-assembling group; $R^5$ represents a hydrogen atom or a methyl group; $R^6$ represents a hydrocarbon group having 3 to 30 carbon atoms; $L^4$ represents —O— or —NH—; m, n and o represent the abundance ratios of the units, and each of m and n represents a numerical value more than 0 and o represents a numeral value not less than 0.

10. The adhesive according to claim 9 wherein $R^1$ represents a hydrogen atom or a methyl group; $L^1$ represents —O— or —NH—; $R^2$ represents a hydrocarbon group having 1 to 6 carbon atoms; X represents a hydroxy group or an amino group which may form an ammonium salt; $R^3$ represents a hydrogen atom or a methyl group; $R^4$ represents a hydrocarbon group having 3 to 20 carbon atoms; $L^2$ represents —O— or —NH—; $L^3$ represents —CO—; $R^6$ represents a hydrocarbon group having 4 to 10 carbon atoms; A represents an amino acid residue or oligopeptide which contains at least one amino acid selected from the group consisting of alanine, leucine, isoleucine and valine as a constituent amino acid; and m:n:o satisfies (2 to 20):1:(0 to 3) in formula (I).

11. The adhesive according to claim 5, wherein the curing agent is an amidating agent for carboxyl terminals of a unit of the oligopeptide.

12. The adhesive according to claim 1, having an in-water curable property.

13. A method for producing the adhesive according to claim 1, comprising:
mixing the organic polymer with the curing agent.

* * * * *